United States Patent
Wu

(10) Patent No.: US 6,805,945 B1
(45) Date of Patent: Oct. 19, 2004

(54) WATERPROOF HEAT-PRESERVATIVE FILM AND MANUFACTURE METHOD THEREOF

(75) Inventor: Chieh-Jen Wu, Kao-Hsiung (TW)

(73) Assignee: Cheng Loong Corporation, Taipei Hsien (TW)

(*) Notice: Subject to any disclaimer, the term of this patent is extended or adjusted under 35 U.S.C. 154(b) by 27 days.

(21) Appl. No.: 10/429,740

(22) Filed: May 6, 2003

(51) Int. Cl.[7] .............................. B32B 7/02; B28B 3/20
(52) U.S. Cl. ............... 428/221; 428/402.21; 264/176.1; 264/211.24
(58) Field of Search .......................... 428/221, 402.21; 264/176.1, 211.24

(56) References Cited

U.S. PATENT DOCUMENTS

| | | | | |
|---|---|---|---|---|
| 5,366,801 A | * | 11/1994 | Bryant et al. ................ 442/131 |
| 5,585,475 A | * | 12/1996 | Jamieson et al. ........... 536/23.1 |
| 6,099,894 A | * | 8/2000 | Holman .................... 427/126.3 |
| 6,207,738 B1 | * | 3/2001 | Zuckerman et al. ........ 524/156 |

* cited by examiner

*Primary Examiner*—Samuel A. Acquah
(74) *Attorney, Agent, or Firm*—Bacon & Thomas PLLC

(57) ABSTRACT

A waterproof heat-preservative film is formed by providing a melt of a waterproof material, mixing phase-change microcapsules with the melt to form a mixture, solidifying the mixture and pulverizing the solidified mixture to form particles containing phase-change microcapsules, and forming a film with the particles by means of extruding or blowing.

16 Claims, 2 Drawing Sheets

WATERPROOF HEAT-PRESERVATIVE FILM AND MANUFACTURE METHOD THEREOF

BACKGROUND OF THE INVENTION

1. Field of the Invention

The present invention relates generally to a waterproof film having heat-preservative function and its manufacture method, more specifically, it relates to a waterproof heat-preservative film made by mixing phase-change microcapsules with a waterproof material and the manufacture method thereof.

2. The Prior Arts

With the development of technology, the natural materials used in dresses for outdoor activities in early days are getting out-of-date and gradually replaced by advanced artificial materials, except some minor materials with excellent specific properties, such as eiderdown.

For application under severe outdoor conditions, the sports clothes must be heat-preservative, waterproof, and lightweight. A waterproof cloth usually comprises a waterproof layer coated on an inner layer of the cloth. The material that is occasionally used as the waterproof layer includes polyurethane (PU), polyethylene (PE), acrylic resin, and the like. On the other hand, for heat preservation, the material, which is usually double-layered to keep air inside, could be eiderdown, artificial fiber, and cotton.

A dress made of any of abovesaid materials can preserve heat to some extents. However, it is usually heavy and thick. Changing phase of a substance to absorb and release heat is recently employed in preservation of heat for cloth industry wherein a phase-change material (PCM) is mixed with textile for heat preservation.

A typical phase-change material is capable of absorbing and/or releasing a substantial amount of heat when its phase changes, for example, from a solid state into a liquid state or vice versa. Paraffin hydrocarbon is an example of the phase-change materials employed in absorbing heat at a desired or higher temperature for being fused.

When a phase-change material is heated, it absorbs heat and preserves thermal energy by means of physical phase change. If heating goes continuously, the phase-change material is gradually and melted and consequently becomes a liquid phase. Thus, in order to prevent loss of the phase-change material in liquid phase, a high-molecular stuff is commonly adopted for packing the phase-change material in micro-capsulated form for repeat use.

Nowadays, the technology of phase-change microcapsules has already been applied to textiles. For instance, U.S. Pat. No. 5,585,475 proposes to mix a phase-change material with polymers for blending fibers and preparing clothing or bedding. In addition, U.S. Pat, Nos. 5,366,801 and 6,099,894 propose to blend a phase-change material with a polymer and to coat the mixture on surface of fiber or textile for preparation of heat-preservative clothes. U.S. Pat. No. 6,207,738 discloses a wet-style coating method for coating textile with a phase-change material in order to produce heat-preservative clothes.

However, the manufacture procedure by either blending or coating the phase-change material on surface of textile is rather complicated and expensive.

SUMMARY OF THE INVENTION

A primary objective of the present invention is to provide a waterproof, heat-preservative film by mixing phase-change microcapsules having heat-preservation function with a waterproof material and extruding or blowing the mixture to form the desired waterproof, heat-preservative film.

Another objective of the present invention is to provide a method for manufacturing a waterproof, heat-preservative film with reduced costs.

Yet, another objective of the present invention is to make waterproof, heat-preservative clothes based on the material made in accordance with the present invention.

In order to realize abovesaid objectives, a waterproof, heat-preservative film can be manufactured with the following steps:

(a) selecting a phase-change material and preparing microcapsules containing the phase-change material by mixing the phase-change material with a polymer;

(b) selecting a waterproof material and melting the waterproof material;

(c) uniformly mixing the micro-capsulated phase-change material in the melted waterproof material and solidifying the mixture that is in liquid stale by cooling it down to the room temperature and pulverizing the solid to form plastic particles containing phase-change microcapsules; and (d) finally, using a film-blowing machine to form waterproof, heat-preservative plastic films with the plastic particles.

The plastic film so made can be cut and further processed for manufacturing waterproof heat-preservative clothes.

The waterproof material includes, but not limited to, thermoplastic polyurethane (TPU), polyethylene (PE), and acrylic resin. The phase-change material that is contained in the microcapsule is selected in accordance with ambient temperature and operation temperature and is subject to no specific constraints. The phase-change material includes, but not limited to, paraffinic hydrocarbons, straight-chain paraffins, or high-class alcohols. The phase-change materials could be microcapsulated and processed for further applications.

For more detailed information regarding advantages or features of the present invention, at least an example of preferred embodiment will be described below with reference to the annexed drawings.

BRIEF DESCRIPTION OF THE DRAWINGS

The related drawings in connection with the detailed description of the present invention to be made later are described briefly as follows, in which.

DETAILED DESCRIPTION OF THE PREFERRED EMBODIMENT

Figure 1:
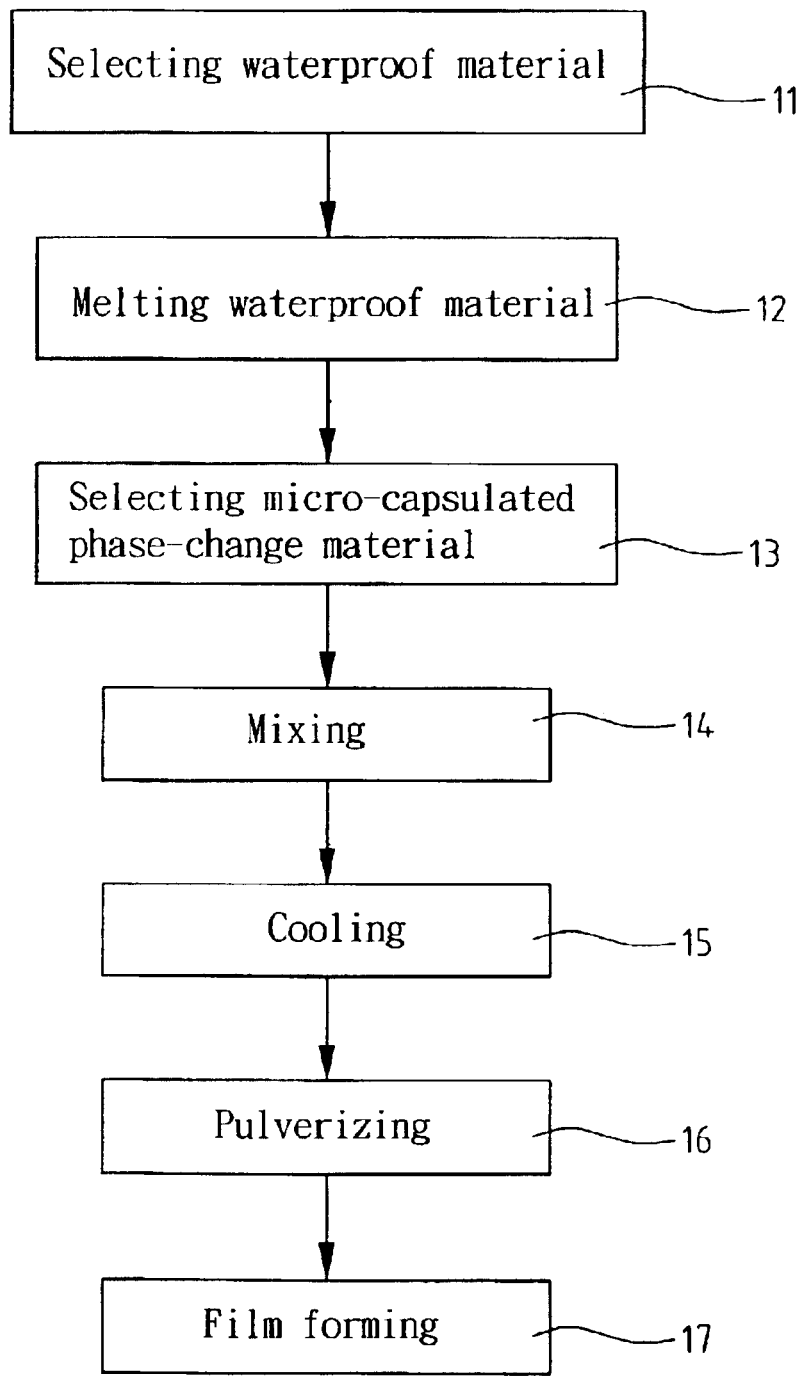
FIG. 1 is a flowchart of a method for producing a waterproof, heat-preservative film according to the present invention.

FIG. 1 is a flowchart of a method for producing waterproof heat-preservative film in accordance with the present invention. In step 11, a waterproof heat-preservative material is selected for example from a group consisting of thermoplastic polyurethane (TPU), polyethylene (PE), and acrylic resin. In step 12, the selected material is melted by heating, in which heating time and temperature are adjusted depending on the physical and chemical properties of the selected material. In step 13, a micro-capsulated phase-change material with proven heat preservability is selected. In step 14, the micro-capsulated phase-change material of step 13 and the melted waterproof material of step 12 are mixed together to form a uniform mixture. In step 15, the mixture is cooled down to room temperature with a cooling system, water bathing for example, so as to solidify the mixture. In step 16, the solidified material is pulverized to form plastic particles containing the phase-change microcapsules. Step 17 is a final step in which the plastic particle of step 16 are fed into a film-forming machine for obtaining film either through extruding or blowing. The obtained film can be further processing, such as cutting, for being attached inside or outside on clothes to achieve waterproof and heat-preservative purposes.

Figure 2:
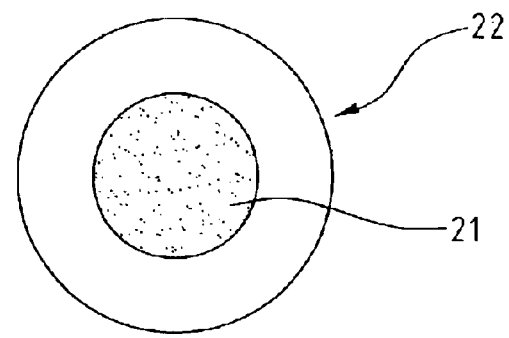
FIG. 2 is a cross-sectional view of a phase-change microcapsule manufactured in accordance with the present invention.

Also referring to FIG. 2, a phase-change microcapsule 22 according to the present invention comprises a core 21 of the phase-change material. The phase-change material can be selected in accordance with different ambient temperature and operation temperature without any specific constraints. The phase-change material could include, but not limited to, paraffinic hydrocarbons, straight-chain paraffins, and high-class alcohols. As the melting point of the phase-change material fitful with human textile is ranged around 30° C., it is appropriate to choose Lauryl alcohol or Tetradecanol for preparing the phase-change microcapsules with a melting point at 30° C. approximately.

Figure 3:
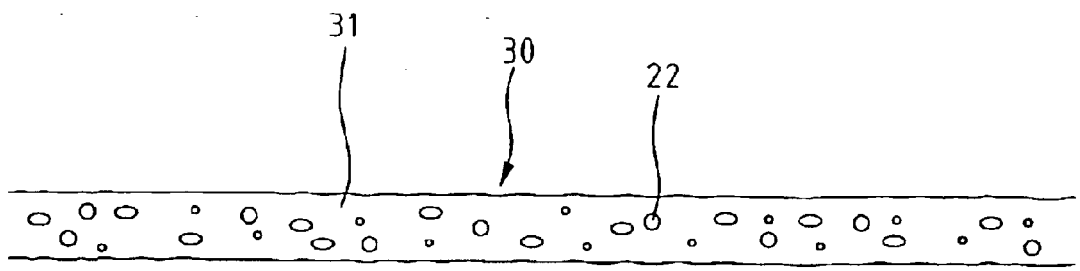
FIG. 3 is a cross-sectional view of a plastic film obtained according to the manufacture method of this invention.

Also referring to FIG. 3, a plastic film 30 manufactured with the method of the present invention comprises the microcapsules 22 containing the phase-change material 21. The microcapsules 22 are uniformly distributed in a waterproof material 31 of the plastic film 30. The waterproof material could include, but not limited to, TPU, PE, and acrylic resin.

The mixing ratio of the phase-change microcapsule 22 with respect to the waterproof material 31 is that in a total of 100 parts, the phase-change microcapsule 22 takes 5–70 parts, preferably 20–40 parts.

An example will be presented with reference to the drawings annexed for further description. It is apparent that numerous changes or modifications may be made without departing from the true spirit and scope thereof, as set forth in the claim below.

Embodiment 1
Preparation of Waterproof Heat-preservative Plastic Film
The procedure comprises the following steps:

taking melamine by 6 parts and formaldehyde (37%) by 21 parts, adding water, 73 parts, and heating for 1 hour under 60° C. to obtain a first emulsion;

taking polyvinyl alcohol,(PVA) by 2 parts and pouring it into 40 parts of water, heating to 60° C., adding Lauryl alcohol and Tetradecanol by 2.5 parts respectively, agitating in an agitating machine at 6000 rpm for 5 minutes to obtain a second emulsion;

adding the second emulsion to the first emulsion, adjusting pH to 6 by 1N hydrochloric acid, then heating 4 hours for reaction at 60° C. to form a liquid;

adjusting pH of the liquid after reaction to 9 with aqua ammonia, filtering the liquid at room temperature and drying sediment of the liquid to obtain the microcapsules containing phase-change material;

taking TPU by 70 parts and heating and melting it, adding to it with foregoing dried microcapsules by 30 parts, then kneading it with a double-auger kneader to mix the phase-change microcapsules uniformly in the melted TPU, drying the mixture and pulverizing the dried mixture to form plastic particles containing the phase-change material; and finally, forming plastic film having a thickness of for example 25 $\mu$m by means of blowing with a film-blowing machine.

What is claimed is:

1. A method for manufacturing waterproof heat-preservative film comprising the following steps:
   (1) selecting a waterproof material;
   (2) heating and melting the waterproof material;
   (3) selecting a phase-change material for micro-capsulating;
   (4) uniformly mixing the micro-capsulated phase-change material in the melted waterproof material with a predetermined mixing ratio to form a mixture;
   (5) solidifying the mixture and pulverizing the solidified mixture to form particles containing the phase-change microcapsules; and
   (6) forming a plastic film with the particles by a film-forming machine.

2. The method according to claim 1, wherein in step (4), the micro-capsulated phase-change material is mixed by an amount of 5–70 parts in a total of 100 parts of the phase-change material and the waterproof material.

3. The method according to claim 2, wherein the micro-capsulated phase-change material is mixed by an amount of 20–40 parts in a total of 100 parts of the phase-change material and the waterproof material.

4. The method according to claim 1, wherein the waterproof material is selected from a group consisting of thermoplastic polyurethane, polyethylene and acrylic resin.

5. The method according to claim 1, wherein the step of forming a plastic film comprises a step of extruding the particles to form the film.

6. The method according to claim 1, wherein the step of forming a plastic film comprises a step of blowing.

7. A method for manufacturing waterproof plastic particle containing phase-change material comprising the following steps:
   (a) selecting a waterproof material;
   (b) heating and melting the waterproof material;
   (c) selecting a phase-change material for micro-capsulating;
   (d) uniformly mixing the micro-capsulated phase-change material with the waterproof material at a predetermined mixing ratio to form a mixture; and
   (e) solidifying the mixture and pulverizing the solidified mixture to form particles containing phase-change microcapsules.

8. The method according to claim 7, wherein in step (d), the micro-capsulated phase-change material is mixed by an amount of 5–70 parts in a total of 100 parts of the phase-change material and the waterproof material.

9. The method according to claim 7, wherein the micro-capsulated phase-change material is mixed by an amount of 20–40 parts in a total of 100 parts of the phase-change material and the waterproof material.

10. The method according to claim 7, wherein the waterproof material is selected from a group consisting of thermoplastic polyurethane, polyethylene and acrylic resin.

11. A waterproof heat-preservative film, which is prepared according to the following steps:
   (i) selecting a waterproof material;
   (ii) heating and melting the waterproof material;

(iii) selecting a phase-change material for micro-capsulating;

(iv) uniformly mixing the micro-capsulated phase-change material with the melted waterproof material at a predetermined mixing ratio to form a mixture;

(v) solidifying the mixture and pulverizing the solidified mixture to form particles containing the phase-change microcapsules; and (vi) forming a waterproof heat-preservative film with the particles by a film-forming machine.

12. The waterproof heat-preservative film according to claim 11, wherein in step (iv), the micro-capsulated phase-change material is mixed by an amount of 5–70 parts in a total of 100 parts of the phase-change material and the waterproof material.

13. The waterproof heat-preservative film according to claim 11, wherein the micro-capsulated phase-change material is mixed by an amount of 20–40 parts in a total of 100 parts of the phase-change material and the waterproof material.

14. The waterproof heat-preservative film according to claim 11, wherein the waterproof material is selected from a group consisting of thermoplastic polyurethane, polyethylene and acrylic resin.

15. The waterproof heat-preservative film according to claim 11, wherein the film is formed by extruding.

16. The waterproof heat-preservative film according to claim 1, wherein the film is formed by blowing.

* * * * *